United States Patent
Demers et al.

[11] Patent Number: 5,870,761
[45] Date of Patent: Feb. 9, 1999

[54] PARALLEL QUEUE PROPAGATION

[75] Inventors: Alan Demers, Boulder Creek; James Stamos, San Jose; Sandeep Jain, Belmont; Brian Oki, San Jose; Roger J. Bamford, Woodside, all of Calif.

[73] Assignee: Oracle Corporation, Redwood Shores, Calif.

[21] Appl. No.: 770,573

[22] Filed: Dec. 19, 1996

[51] Int. Cl.$^6$ .................................................. G06F 17/30
[52] U.S. Cl. .................. 707/201; 707/1; 707/2; 707/7; 707/8; 707/10; 707/101; 707/103; 707/203
[58] Field of Search ................. 707/10, 103, 2, 707/7, 8, 101, 201, 203, 1

[56] References Cited

U.S. PATENT DOCUMENTS

| | | | |
|---|---|---|---|
| 4,432,057 | 2/1984 | Daniell et al. | 707/8 |
| 4,551,830 | 11/1985 | Huffman | 370/249 |
| 5,058,051 | 10/1991 | Brooks | 711/167 |
| 5,170,480 | 12/1992 | Mohan et al. | 707/201 |
| 5,261,094 | 11/1993 | Everson et al. | 707/201 |
| 5,347,653 | 9/1994 | Flynn et al. | 707/203 |
| 5,383,186 | 1/1995 | Shinn et al. | 370/85.5 |
| 5,463,772 | 10/1995 | Thompson et al. | 707/101 |
| 5,511,188 | 4/1996 | Pascucci et al. | 707/203 |
| 5,530,855 | 6/1996 | Satoh et al. | 707/202 |
| 5,613,113 | 3/1997 | Goldring | 707/202 |
| 5,640,561 | 6/1997 | Satoh et al. | 707/202 |
| 5,678,061 | 10/1997 | Mourad | 395/841 |
| 5,684,990 | 11/1997 | Boothby | 707/203 |
| 5,689,506 | 11/1997 | Chiussi et al. | 370/388 |
| 5,696,910 | 12/1997 | Pawlowski | 395/280 |

OTHER PUBLICATIONS

Extending Logging for Database Snapshot Refresh, Bo Kahler and Oddvar Risnes, Proceeding of the 13th VLDB Conference, Brighton 1987.

*Primary Examiner*—Thomas G. Black
*Assistant Examiner*—Shahid Alam
*Attorney, Agent, or Firm*—McDermott, Will & Emery

[57] ABSTRACT

A method and system are provided for duplicating at a destination site changes made to data at a source site. According to the method a plurality of streams are established between the source site and the destination site. The plurality of streams are used in parallel to propagate changes made at the source site to the destination site. A record of transactions that made changes that need to be propagated from the source site to the destination site is maintained at the source site. Before propagating changes made by a transaction to the destination site on a stream of the plurality of streams, the record of transactions is inspected to identify a set of transactions whose changes are not known to have been made permanent at the destination site. It is then determined whether the transaction could possibly depend on any transaction in the set of transactions. If the transaction could not possibly depend on any transaction in the set of transactions, then the changes made by the transaction are propagated to the destination site using one of the plurality of streams.

31 Claims, 9 Drawing Sheets

PARALLEL QUEUE PROPAGATION

RELATED APPLICATIONS

The present Application is related to the following Applications; U.S. patent application Ser. No. 08/769,740, entitled "Dequeuing Using Queue Batch Numbers," filed by Alan Demers and Sandeep Jain on Dec. 19, 1996; and U.S. patent application Ser. No. 08/772,003, entitled "Recoverable Replication Without Distributed Transactions," filed by Alan Demers and Sandeep Jain on Dec. 19, 1996 and now U.S. Pat. No. 5,781,912.

FIELD OF THE INVENTION

The present invention relates to database systems, and more particularly to techniques for propagating changes from one site to another.

BACKGROUND OF THE INVENTION

Under certain conditions, it is desirable to store copies of a particular set of data, such as a relational table, at multiple sites. If users are allowed to update the set of data at one site, the updates must be propagated to the copies at the other sites in order for the copies to remain consistent. The process of propagating the changes is generally referred to as replication.

Various mechanisms have been developed for performing replication. Once such mechanism is described in U.S. patent application Ser. No. 08/126,586 entitled "Method and Apparatus for Data Replication", filed on Sep. 24, 1993 by Sandeep Jain and Dean Daniels, the contents of which are incorporated by reference.

The site at which a change is initially made to a set of replicated data is referred to herein as the source site. The sites to which the change must be propagated are referred to herein as destination sites. If a user is allowed to make changes to copies of a particular table that are at different sites, those sites are source sites with respect to the changes initially made to their copy of the table, and destination sites with respect to the changes initially made to copies of the table at other sites.

Replication does not require an entire transaction that is executed at a source site to be re-executed at each of the destination sites. Only the changes made by the transaction to replicated data need to be propagated. Thus, other types of operations, such as read and sort operations, that may have been executed in the original transaction do not have to be re-executed at the destination sites.

Row-level replication and column-level replication constitute two distinct styles of replication. In row-level or column-level replication, the updates performed by an executing transaction are recorded in a deferred transaction queue. The information recorded in the deferred transaction queue includes both the old and the new values for each data item that was updated. Row-level and column-level replication differ with respect to whether old and new values are transmitted for an entire relational row (row-level) or for only a subset of its columns (column-level).

The changes recorded in the deferred transaction queue are propagated to the destination site. The destination site first checks that its current data values agree with the transmitted "old" values. The check may fail, for example, if concurrent changes have been made to the same replicated data at different sites. If the check fails, a conflict is said to have been detected. Various techniques may be used to resolve such conflicts. If no conflict is detected, the current data values at the destination site are replaced with the transmitted "new" values.

Referring to FIG. 1, it illustrates a system in which copies of a table 118 are stored at multiple sites. Specifically, the system includes three sites 100, 102 and 104. Sites 100, 102 and 104 include disks 106, 108 and 110 that store copies 120, 122 and 124 of table 118, respectively. Database servers 130, 132 and 134 are executing at sites 100, 102 and 104, respectively.

Assume that database server 130 executes a transaction that makes changes to copy 120. When execution of the transaction is successfully completed at site 100, a record of the changes made by the transaction is stored in a deferred transaction queue 160 of a replication mechanism 140. Such records are referred to herein as deferred transaction records. Typically, the deferred transaction queue 160 will be stored on a non-volatile storage device so that the information contained therein can be recovered after a failure.

Replication mechanism 140 includes a dequeue process for each of sites 102 and 104. Dequeue process 150 periodically dequeues all deferred transaction records that (1) involve changes that must be propagated to site 102, and (2) that dequeue process 150 has not previously dequeued. The records dequeued by dequeue process 150 are transmitted in a stream to site 102. The database server 132 at site 102 makes the changes to copy 122 of table 118 after checking to verify that the current values in copy 122 match the "old values" contained in the deferred transaction records.

Similarly, dequeue process 152 periodically dequeues all deferred transaction records that (1) involve changes that must be propagated to site 104, and (2) that dequeue process 152 has not previously dequeued. The records dequeued by dequeue process 152 are transmitted in a stream to site 104. The database server 134 at site 104 makes the changes to copy 124 of table 118 after checking to verify that the current values in copy 124 match the "old values" contained in the deferred transaction records.

Various obstacles may impede the efficiency of the replication mechanism 140 illustrated in FIG. 1. For example, a mechanism must be provided which allows dequeue processes 150 and 152 to distinguish between the deferred transaction records within deferred transaction queue 160 that they have already dequeued, and the deferred transaction records that they have not yet dequeued.

Further, a single stream connects dequeue processes 150 and 152 to their corresponding destination sites. Efficiency may be improved by establishing multiple streams between the source site and each of the destination sites. However, there are constraints on the order in which updates must be applied at the destination sites, and the replication mechanism has no control over the order in which commands that are sent over one stream are applied at a destination site relative to commands that are sent over a different stream. Therefore, a transmission scheduling mechanism must be provided if commands are to be sent to a destination site over more than one stream.

Currently, database systems implement replication by executing deferred transactions using two phase commit techniques. During two phase commit operations, numerous messages are sent between the source site and each of the destination sites for each transaction to ensure that changes at all sites are made permanent as an atomic event. While the use of two phase commit techniques ensures that the various databases may be accurately recovered after a failure, the overhead involved in the numerous inter-site messages is significant. Therefore, it is desirable to provide a mechanism that involves less messaging overhead than two phase commit techniques but which still allows accurate recovery after a failure.

SUMMARY OF THE INVENTION

A method and system are provided for duplicating at a destination site changes made to data at a source site. According to the method a plurality of streams are established between the source site and the destination site. The plurality of streams are used in parallel to propagate changes made at the source site to the destination site.

A record of transactions that made changes that need to be propagated from the source site to the destination site is maintained at the source site. Before propagating changes made by a transaction to the destination site on a stream of the plurality of streams, the record of transactions is inspected to identify a set of transactions whose changes are not known to have been made permanent at the destination site. It is then determined whether the transaction could possibly depend on any transaction in the set of transactions. If the transaction could not possibly depend on any transaction in the set of transactions, then the changes made by the transaction are propagated to the destination site using one of the plurality of streams.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for replicating data at multiple sites is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
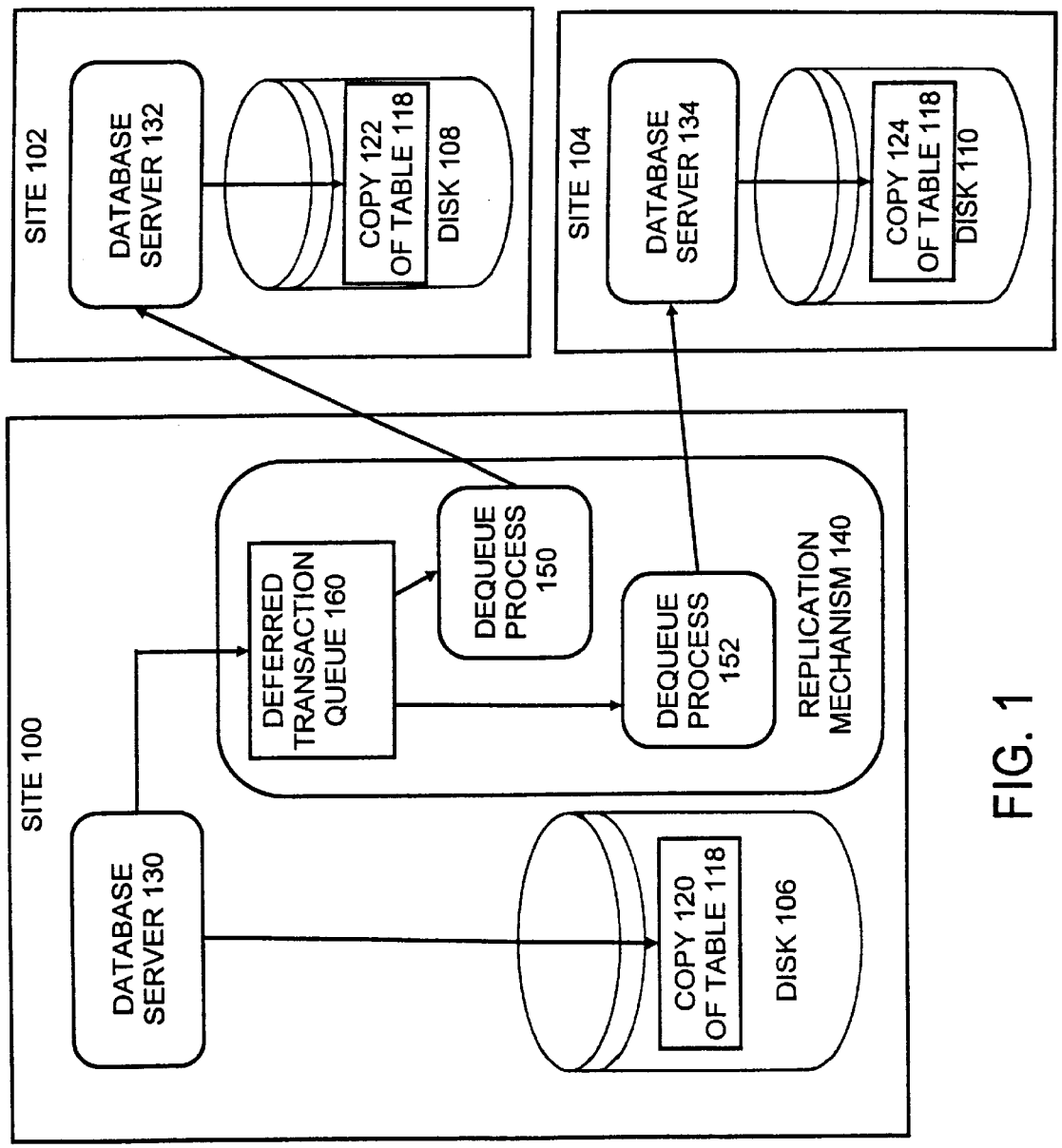
FIG. 1 is a block diagram of a computer system that includes a replication mechanism.
Figure 2:
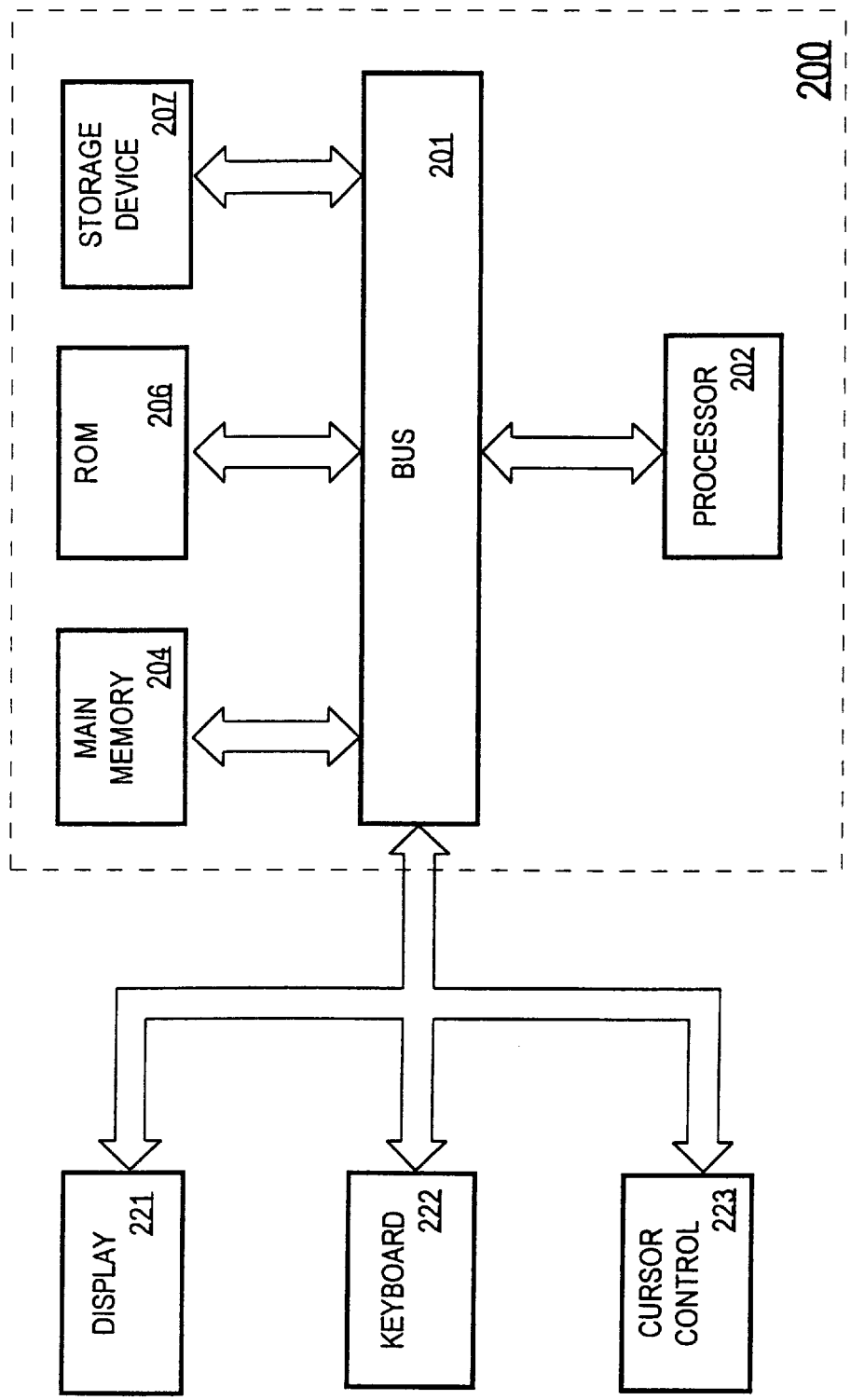
FIG. 2 is a block diagram of a computer system that may be used to implement the present invention.

Referring to FIG. 2, it is a block diagram of a computer system 200 upon which an embodiment of the present invention can be implemented. Computer system 200 includes a bus 201 or other communication mechanism for communicating information, and a processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202. Data storage device 207 is coupled to bus 201 for storing information and instructions.

A data storage device 207 such as a magnetic disk or optical disk and its corresponding disk drive can be coupled to computer system 200. Computer system 200 can also be coupled via bus 201 to a display device 221, such as a cathode ray tube (CRT), for displaying information to a computer user. Computer system 200 further includes a keyboard 222 and a cursor control device 223, such as a mouse.

The present invention is related to the use of computer system 200 to propagate to other sites changes made to data on disk 207. According to one embodiment, replication is performed by computer system 200 in response to processor 202 executing sequences of instructions contained in memory 204. Such instructions may be read into memory 204 from another computer-readable medium, such as data storage device 207. Execution of the sequences of instructions contained in memory 204 causes processor 202 to perform the process steps that will be described hereafter. In alternative embodiments, hard-wired circuitry may be used in place of or in combination with software instructions to implement the present invention. Thus, the present invention is not limited to any specific combination of hardware circuitry and software.

DEQUEUING TECHNIQUES

As mentioned above, one phase of the replication process involves placing deferred transaction records into a deferred transaction queue. According to one embodiment, the deferred transaction queue is implemented as a relational table, where each deferred transaction record is stored as one or more rows within the table.

For example, a transaction record for a given transaction may consist of ten rows within the deferred transaction queue, where each of the ten rows corresponds to an update performed by the transaction and contains an old and new value for the update and an update sequence number that identifies the order in which the update was performed relative to the other updates performed by the transaction. The transaction record also contains a transaction identifier that identifies the transaction and a "prepared time" value that indicates when the transaction finished execution (was "prepared") relative to other transactions. The transaction identifier and the prepared time value of a transaction may be stored, for example, in one of the rows that constitute the transaction record for the transaction.

The process of dequeuing a deferred transaction record for one destination site does not automatically remove the deferred transaction record from the deferred transaction queue because the deferred transaction record may have to be dequeued for other destination sites. Once a deferred transaction record has been dequeued for all destination sites, the deferred transaction record may be removed from the deferred transaction queue by a process that may be entirely independent of the dequeuing processes.

For example, in a replication environment consisting of N sites, each deferred transaction record must be dequeued N−1 times (once for each destination site) before it can be deleted from the deferred transaction queue. Because the act of dequeuing a deferred transaction record does not remove the deferred transaction record from the deferred transaction queue, the presence of a deferred transaction record within the deferred transaction queue does not indicate whether the deferred transaction record has been dequeued for any given destination site.

For each destination site, a dequeuing process repeatedly performs a dequeuing operation on the deferred transaction queue. During every dequeuing operation the dequeuing process performs, it must only dequeue the deferred transaction records for its destination site that it has not already dequeued. Therefore, a mechanism must be provided for determining which deferred transaction records within the deferred transaction queue have already been dequeued for each of the destination sites.

THE PREPARE SEQUENCE APPROACH

One way to keep track of which deferred transaction records have been dequeued for each destination site involves storing within each deferred transaction record a sequence number that indicates the sequence in which the transaction associated with the deferred transaction record was made permanent ("committed") at the source site. Each dequeuing process then keeps track of the highest sequence number of the records that it has dequeued. At each subsequent pass, the dequeuing process only reads those records with higher sequence numbers than the highest sequence number encountered on the previous pass.

When the deferred transaction queue is implemented using a relational table, the process of dequeuing records from the deferred transaction queue may be implemented by executing a query on the table. To implement the prepare sequence approach described above, a dequeuing process would repeatedly execute the equivalent of the SQL query:

select * from queue_table where sequence_number>last_sequence_number order by sequence_number;

Generally, a transaction is not considered committed until a deferred transaction record for the transaction is written into the deferred transaction queue. Therefore, a commit time cannot be assigned to a transaction until the deferred transaction record is written into the deferred transaction queue. Consequently, the deferred transaction record that is written into the deferred transaction queue does not contain the true commit time of the corresponding transaction. In place of the commit time, a "prepared time value" is stored in the transaction record. Prepared time values indicate the time in which transactions completed execution, not the actual time the transactions committed.

Because the transaction records do not contain actual commit times, the prepared time values are used as sequence numbers for the dequeuing technique described above. However, the database system is not able to guarantee that the deferred transaction records of isolated transactions will commit in the order in which the transactions acquire prepare times. Without such a guarantee, deferred transaction records may be written into the deferred transaction queue out of prepare sequence.

The possibility that deferred transaction records may be written into the deferred transaction queue out of prepare sequence renders the prepare sequence approach unusable. For example, assume that two transactions with sequence numbers S1<S2 are inserted into the deferred transaction queue out of order. If a dequeue process performs a dequeue operation after the S2 deferred transaction record is inserted and before the S1 deferred transaction record is inserted, then the highest sequence number seen by the dequeue process will be at least S2. When the dequeue process performs a subsequent dequeue operation, the dequeue process will only dequeue deferred transaction records that have sequence numbers greater than S2. The S1 deferred transaction record will be skipped and may never be dequeued by that dequeue process.

SEQUENCE STAMP LOCKING

One approach to avoid the out-of-sequence problem associated with the prepare sequence approach is to prevent transactions from acquiring prepared time values until the deferred transaction records for all transactions that have previously acquired prepared time values are stored in the deferred transaction queue. If transactions cannot acquire prepared time values until the deferred transaction records for all transactions that have previously acquired prepared time values are stored in the deferred transaction queue, then the commit time order will always reflect the prepared time order. Thus, the prepared time may be treated as the commit time.

For example, an "enqueue lock" may be used to restrict access to the sequence assignment mechanism. Before a transaction can be assigned a sequence number, the transaction must acquire the enqueue lock. The transaction must then hold the enqueue lock until the deferred transaction record for the transaction is actually written to the deferred transaction queue. This technique effectively makes the sequence number assignment and the insertion of the deferred transaction record an atomic operation. The following steps could be used to implement this technique:

begin transaction
perform transaction operations
acquire enqueue lock
acquire sequence number
insert deferred transaction record into deferred transaction queue
commit and release enqueue lock While this technique avoids the out-of-sequence problems associated with the prepare sequence approach, it also creates a bottleneck in transaction processing. Specifically, when numerous concurrent processes complete execution at the same time, one will acquire the enqueue lock and the others will have to await their turn. Thus, while the transactions may be executing in parallel to take full advantage of the processing power of the hardware on which they are executing, they will have to be processed serially upon completion.

RECORD FLAGGING

To avoid the bottleneck associated with the stamp locking process, a record can be maintained to indicate which deferred transaction records have been dequeued for which sites. For example, a plurality of flags may be stored in each deferred transaction record, where each flag corresponds to a destination site. Initially, all of the flags indicate that the deferred transaction record has not been dequeued. During each dequeue pass, the dequeue process inspects each deferred transaction record to determine whether the flag corresponding to the destination site associated with the dequeue process has been set. If the flag has been set, the deferred transaction record is skipped. If the flag has not been set, the dequeue process dequeues the deferred transaction record. When a dequeue process dequeues the deferred transaction record, the dequeue process sets the flag within the deferred transaction record that corresponds to the destination site associated with the dequeue process to indicate that the deferred transaction record has been dequeued for that destination site.

Unfortunately, the record flagging approach has the disadvantage that each deferred transaction record will be updated once for each destination site. This disadvantage is significant because updates involve a relatively large amount of overhead and there may be a large number of destination sites.

As an alternative to using flags within the deferred transaction records, a record that indicates which deferred transaction records have been dequeued for each destination site may be maintained external to the deferred transaction queue. For example, each dequeue process may maintain a dequeued transactions table into which the dequeue process inserts a row for each deferred transaction record that it dequeues, where the row identifies the transaction associated with the dequeued deferred transaction record.

However, the dequeued transaction table approach also involves a significant amount of overhead. Specifically, a row must be generated and inserted for each destination site for every deferred transaction record. In addition, the dequeue query is expensive in that the entire deferred transaction queue may have to be scanned looking for deferred transaction records that are not recorded in a particular dequeued transaction table.

QUEUE BATCH NUMBERS

According to an embodiment of the invention, a "queue batch number" column is added to each deferred transaction record in the deferred transaction queue. When a deferred transaction record is initially inserted into the queue, the queue batch value is set to some default value. Before dequeuing deferred transaction records, each dequeue process "stamps" the deferred transaction queue by setting the queue batch values in all of the deferred transaction records that have the default queue batch value to a queue batch number that is greater than any queue batch number that has previously been assigned to any deferred transaction record. The dequeue process then dequeues all of the records that have queue batch numbers greater than the queue batch number used by that dequeue process in its previous batch stamping operation.

Figure 3A:
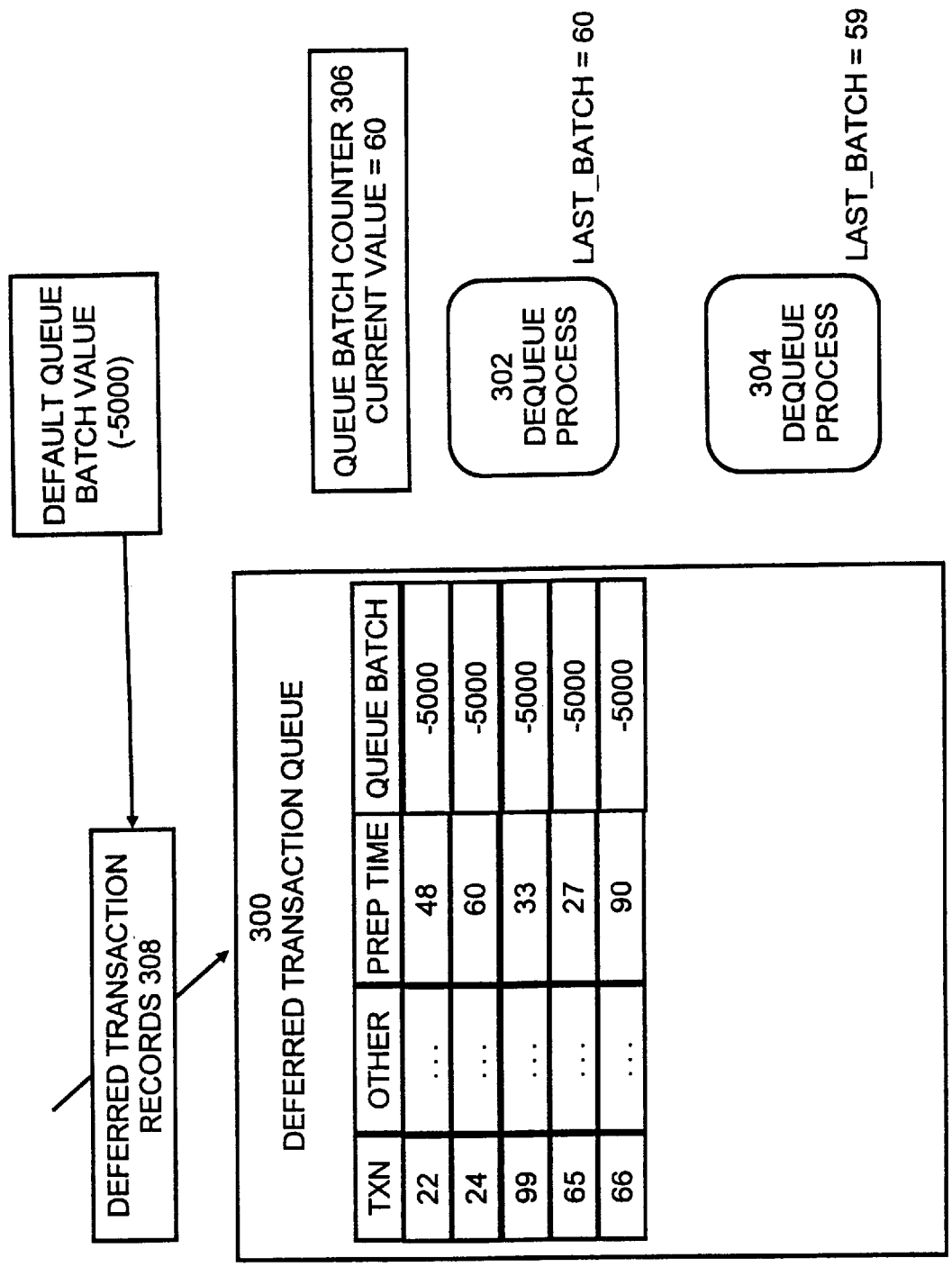
FIG. 3A is block diagram of a portion of a replication system in which queue batch numbers are used to coordinate dequeuing operations according to an embodiment of the invention.

The queue batch number stamping technique is illustrated in FIGS. 3A–3D. Referring to FIG. 3A, it illustrates an embodiment of the invention in which a deferred transaction queue 300 is implemented using a table. Deferred transaction records 308 are inserted into deferred transaction queue 300 by a database server after the transactions are prepared at the local (source) site. Prior to insertion into deferred transaction queue 300, these deferred transaction records are assigned the default queue batch value. In the illustrated embodiment, the default queue batch value is −5000.

At the time illustrated in FIG. 3A, deferred transaction records for five transactions have been inserted into the deferred transaction queue 300. None of the transactions have yet been dequeued by any dequeue process, and therefore all still contain the default queue batch value. Dequeue process 302 has previously dequeued deferred transaction records with queue batch numbers up to 60, and therefore stores the value "60" as its LAST_BATCH number. Dequeue process 304 has previously dequeued deferred transaction records with queue batch numbers up to 59, and therefore stores the value "59" as its LAST_BATCH number.

Prior to performing a dequeue operation, dequeue process 304 performs a batch stamping operation on deferred transaction queue 300. During the batch stamping operation, all deferred transaction records within deferred transaction queue 300 that currently hold the default queue batch number (−5000) are stamped with a higher queue batch number than has previously been assigned to any deferred transaction records. To ensure that the new queue batch number is higher than any previously assigned queue batch number, a queue batch counter 306 is used to track the highest previously assigned batch number. Initially, the queue batch counter is set to a value that is greater than the default queue batch number. At the time illustrated in FIG. 3A, the highest previously assigned queue batch value is 60.

Figure 3B:
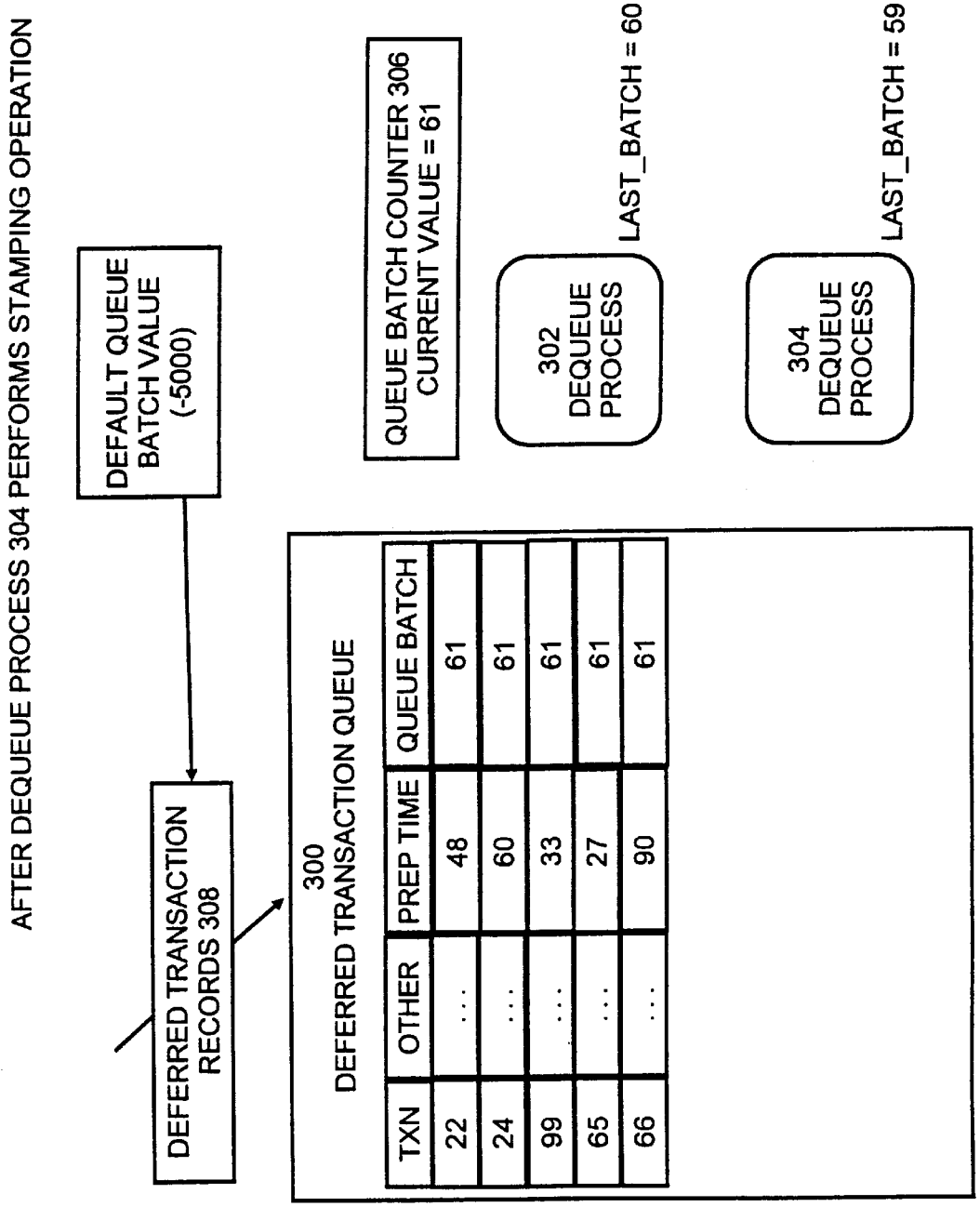
FIG. 3B illustrates the system of FIG. 3A after a stamping operation is performed.

FIG. 3B illustrates deferred transaction queue 300 after dequeue process 304 has performed a batch stamping operation. The queue batch counter 306 is incremented, increasing the value of the counter to 61. The deferred transaction records within deferred transaction queue 300 that previously stored the default queue batch value of −5000 now store the new queue batch value of 61. After the batch stamping operation, dequeue process 304 dequeues all of the deferred transaction records that have queue batch values that are higher than the highest queue batch value previously used by dequeue process 304. At the time illustrated in FIG. 3B, the LAST_BATCH value of dequeue process 304 is 59, and the five deferred transaction records in deferred transaction queue 300 have queue batch values of 61. Therefore, dequeue process 304 will dequeue all five of the deferred transaction records.

Figure 3C:
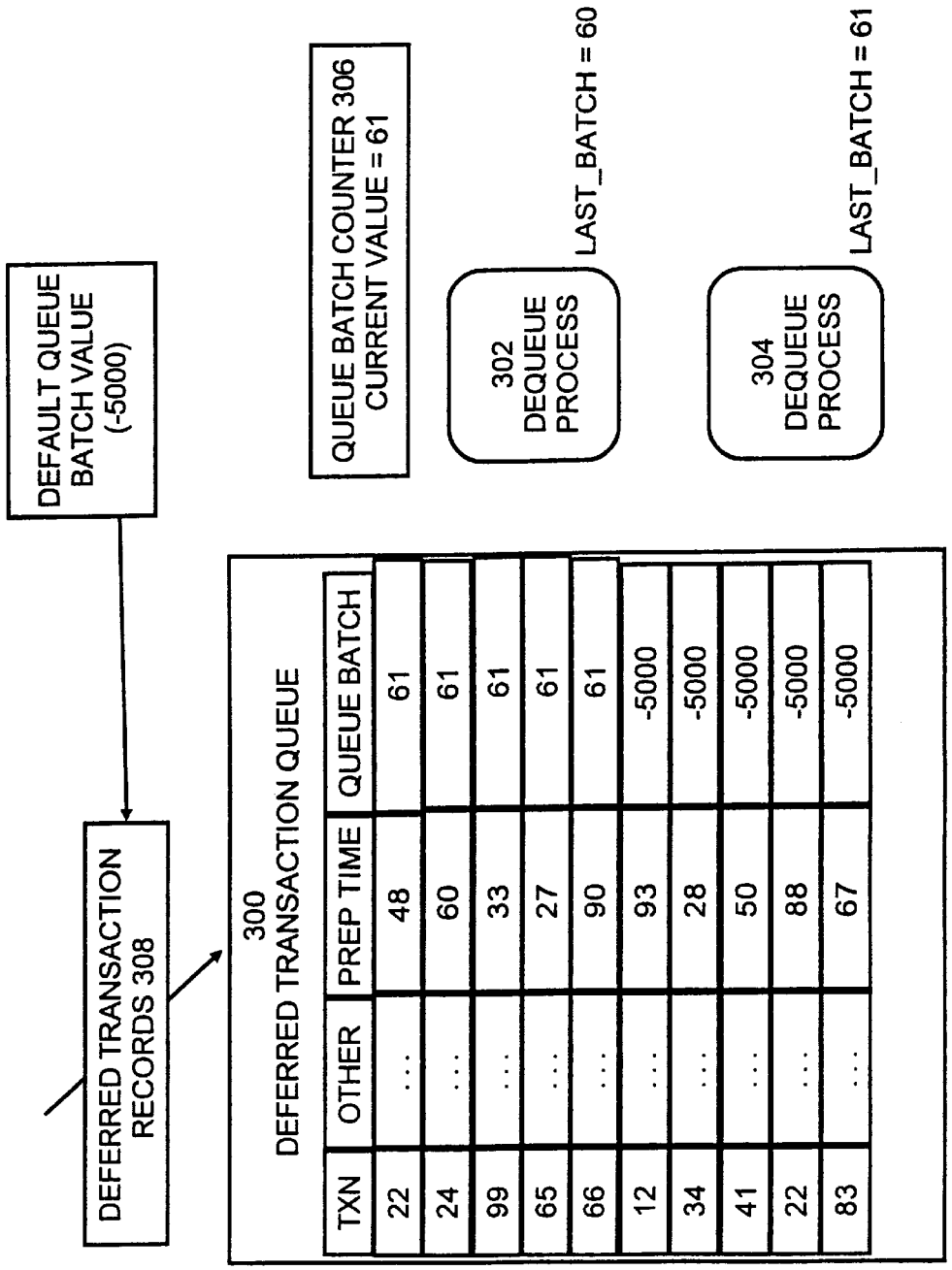
FIG. 3C illustrates the system of FIG. 3B after a dequeuing operation is performed.

FIG. 3C illustrates deferred transaction queue 300 after dequeue process 304 has performed a dequeue operation. The LAST_BATCH value of dequeue process 304 has been updated to reflect that dequeue process has dequeued all deferred transaction records with queue batch values up to 61.

At the time illustrated in FIG. 3C, five new deferred transaction records have been inserted into deferred transaction queue 300 since the batch stamping operation performed by dequeue process 304. These new deferred transaction records have been assigned the default queue batch value. As long as the new deferred transaction records were added after the batch stamping operation, the new deferred transaction records will not have been dequeued by dequeue process 304 regardless of whether they were inserted before or after the dequeue operation because dequeue process 304 only dequeued those deferred transaction records with queue batch values greater than 59.

Figure 3D:
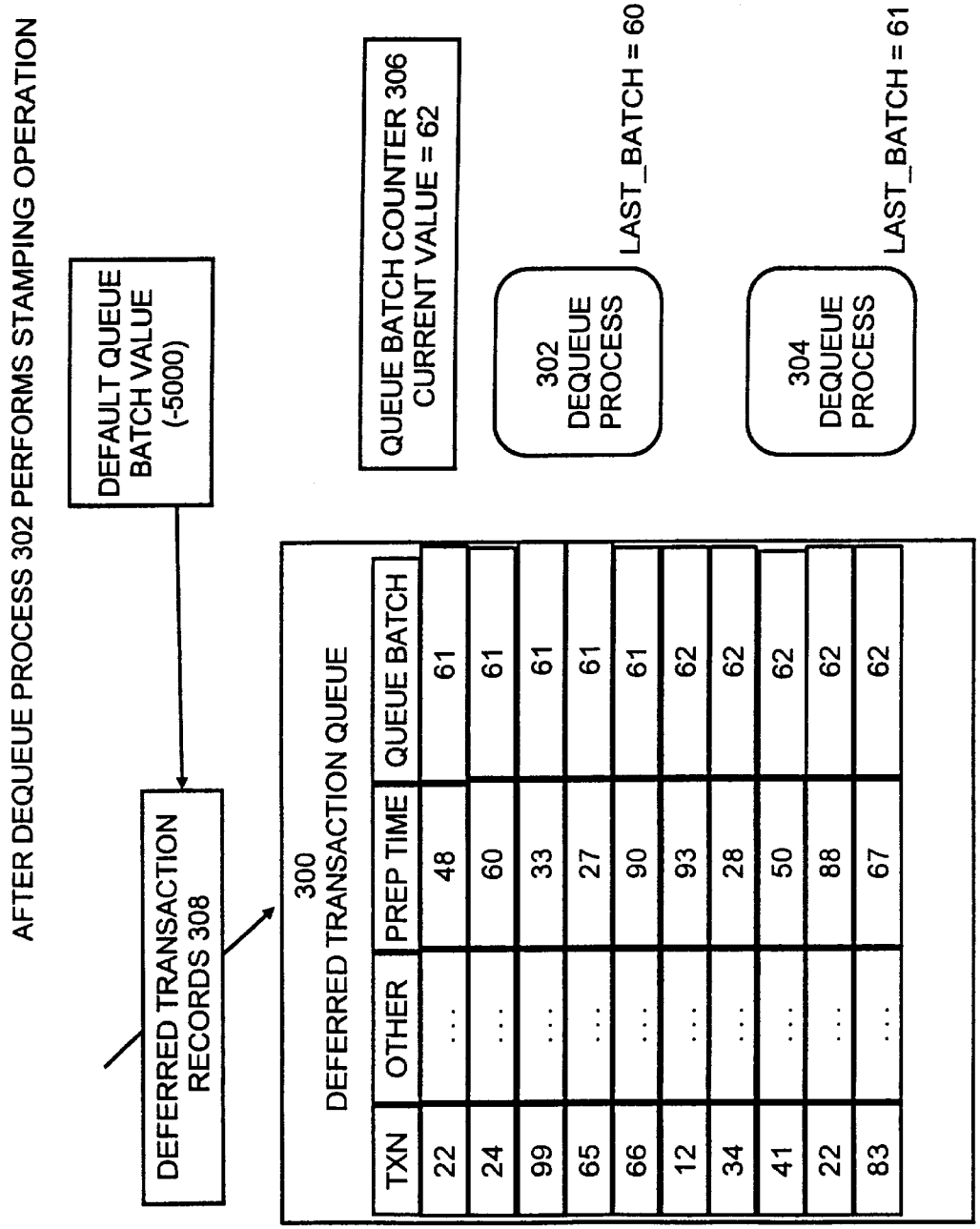
FIG. 3D illustrates the system of FIG. 3C after another stamping operation is performed.

Assume that at the time illustrated in FIG. 3C, dequeue process 302 performs a batch stamping operation. Dequeue process 302 increments the queue batch counter to 62, and stamps all of the deferred transaction records that have the default queue batch value with the new queue batch value of 62. FIG. 3D illustrates the state of deferred transaction queue 300 after dequeue process 302 has performed such a batch stamping operation. Dequeue process 302 may then perform a dequeue operation in which dequeue process 302 dequeues all deferred transaction records with queue batch values greater than 60. During the dequeue operation, dequeue process 302 would dequeue all of the deferred transaction records previously dequeued by dequeue process 304, as well as all of the new deferred transaction records. After the dequeue operation, dequeue process 302 would update its LAST_BATCH value to 62.

Assume that no new records arrive after the time illustrated in FIG. 3D and the next batch stamping operation is performed by dequeue process 304. Under these conditions, the queue batch counter 306 would be incremented to 63, but none of the deferred transaction records within deferred transaction queue 300 will be updated. Dequeue process 304 would only dequeue those deferred transaction records with queue batch values greater than the LAST_BATCH value of dequeue process 304. In the illustrated example, the LAST_BATCH value of dequeue process 304 is 61. Therefore, dequeue process 304 would only dequeue those deferred transaction records that it did not dequeue in its previous dequeue operation.

By comparing LAST_BATCH numbers with queue batch numbers, dequeue processes can quickly distinguish between deferred transaction records they have already dequeued, and deferred transaction records they have not yet dequeued. Using this technique, many deferred transaction records can be concurrently written into the deferred transaction queue 300 out of prepared time order without adversely affecting dequeue operations. Therefore, the bottleneck associated with the sequence stamp locking technique described above is avoided.

Further, each deferred transaction record is only updated once, not once for every destination site. Specifically, each deferred transaction record will only be updated during the first batch stamping operation performed after the deferred transaction record has been inserted into the deferred transaction queue 300 and stamped with a non-default queue batch number. Therefore, this technique avoids the significant overhead associated with the record flagging techniques described above.

SEQUENTIAL PROCESSING

According to one embodiment, dequeued transactions are processed sequentially, not as atomic "batches" of transactions. The order in which a transaction is processed is based on both the batch number of the transaction and the prepared time of the transaction. Specifically, transactions are dequeued in <batch number, prepared time> order. Thus, for each dequeue process, transactions with older batch numbers are processed before transactions with newer batch numbers. Within a batch, transactions with older prepared times are processed before transactions with newer prepared times.

Because batches are not processed as atomic units, the LAST_BATCH value alone is not enough to indicate which transactions have and have not been processed by a particular dequeuing process. According to one embodiment, a <LAST_BATCH, transaction identifier> value pair is maintained by each dequeue process to indicate the last transaction to be processes by the dequeuing process. After a failure, the <LAST_BATCH, transaction identifier> value pair for a dequeue process may be used to determine which transactions must still be processed by the dequeue process.

SCHEDULING BATCH STAMPING OPERATIONS

In the embodiment described above, the dequeue processes perform batch stamping operations before every dequeue query they perform. However, a batch stamping operation does not need to be performed before a dequeuing query for a given site as long as a batch stamping operation has been performed subsequent to the last dequeuing query for the given site. Further, as long as at least one batch stamping operation is performed between consecutive dequeue queries for a given site, the actual number of batch stamping operations performed between consecutive dequeue operations for a site will not affect the dequeue query.

For example, at the time shown in FIG. 3C, dequeue process 302 can perform a dequeue query without first performing a batch stamping operation. This is possible because dequeue process 304 performed a batch stamping operation since the last dequeue query performed by dequeue process 302. Under these circumstances, the newly arrived deferred transaction records would not be dequeued by dequeue process 302 until a subsequent dequeue query is performed by dequeue process 302. The present invention is not limited to any particular mechanism for scheduling batch stamping operations relative to dequeue operations.

In the embodiment described above, each destination site has a dequeue process and the dequeue processes perform the batch stamping operations. In alternative embodiments, each destination site may have more than one dequeue process, and each dequeue process may service more than one destination site. Further, batch stamping operations may be performed by one or more processes executing independent of the dequeue processes, or by recursive transactions initiated by the dequeue processes.

PURGING THE DEFERRED TRANSACTION QUEUE

Once a deferred transaction record has been processed for all destination sites to which it must be propagated, the deferred transaction record can be deleted from the deferred transaction queue. According to one embodiment, a process responsible for purging the deferred transaction queue reads the <LAST_BATCH, transaction-id> value pair for each of the destination sites. The <LAST_BATCH, transaction-id> value pair maintained by each dequeue process indicates the last transaction encountered by that dequeue process.

Each dequeue process will maintain its own <LAST_BATCH, transaction-id> value. Of all the transactions thus identified, the transaction with the lowest <batch number, prepared time> value represents the most recent transaction that has been encountered by the dequeue processes for all sites (the "global bookmark"). The purging process deletes all deferred transaction records in the deferred transaction queue for transactions that have lower <batch number, prepared time> values than the global bookmark (except for transactions currently marked with the default batch value), since these deferred transaction records have been dequeued for all destination sites for which they need to be dequeued.

A dequeue process may not dequeue some deferred transaction records it encounters because the deferred transaction records do not have to be propagated to the destination site associated with the dequeue process. According to one embodiment, the <LAST_BATCH, transaction-id> value for each site is updated based on all deferred transaction records encountered (but not necessarily dequeued) during the dequeue operations. Specifically, each dequeue process updates its <LAST_BATCH, transaction-id> value based on all deferred transaction records it sees during a dequeue operation, including those deferred transaction records that it does not actually dequeue.

For example, assume that the <LAST_BATCH, transaction-id> value for a dequeue process associated with a destination site A is <20, 5>. During a dequeue operation, the dequeue process encounters two deferred transaction records with batch numbers higher than 20. The first deferred transaction record is for a transaction TXA, has a queue batch number of 23 and must be dequeued for site A. The second deferred transaction record is for a transaction TXB, has a queue batch number of 25 and does not have to be dequeued for site A. Under these circumstances, the dequeue process updates its <LAST_BATCH, transaction-id> value to <25, TXB> after performing the dequeue operation.

Consequently, the <LAST_BATCH, transaction-id> value for each site will be updated according to the frequency (F1) that dequeue operations are performed for that site, not the frequency (F2) at which changes are actually propagated to that site. For sites to which changes must rarely be propagated, F1 may be significantly greater than F2. As a result, the delay between that time at which a deferred transaction record has been dequeued for all necessary sites and the time at which the deferred transaction record is deleted from the deferred transaction queue can be significantly shorter than it would be if the <LAST_BATCH, transaction-id> values were only updated based on the deferred transaction records that a dequeue process actually dequeues.

TRANSACTION PROPAGATION

In replication, propagating a transaction to a destination site is performed by causing the destination site to execute operations that make at the destination site the changes made by the transaction at the source site. According to one embodiment, the source site transmits a stream of information to the destination site to cause such operations to be performed.

Specifically, the source site sends deferred transactions to a destination site as a sequence of remote procedure calls, essentially described in U.S. patent application Ser. No. 08/126,586 entitled "Method and Apparatus for Data Replication", filed on Sep. 24, 1993 by Sandeep Jain and Dean Daniels. Deferred transaction boundaries are marked in the stream by special "begin-unit-of-work" and "end-unit-of-work" tokens that contain transaction identifiers.

The destination site receives messages on the stream. When it receives the "begin-unit-of-work" token, the destination site starts a local transaction for executing the procedure calls that will follow the "begin-unit-of-work" token. Such transactions are referred to herein as replication transactions. A replication transaction executes the procedure calls specified in the stream until it encounters the next "end-unit-of-work" token. When the "end-unit-of-work" token is encountered, the replication transaction is finished. The destination site continues reading and processing deferred transactions using replication transactions in this manner until the stream is exhausted.

When distributed transactions are used to perform replication, a replication transaction enters a "prepared" state when the "end-unit-of-work" token is encountered. The destination site informs the source site that the replication transaction is prepared and awaits a commit instruction from the source site. The two phase commit operation used by distributed transactions is described in greater detail below. Also described below is an alternative to the use of distributed transactions in which the replication transaction can be committed immediately after it is prepared, without further communication with the source site.

DEPENDENCIES BETWEEN TRANSACTIONS

After a deferred transaction record has been dequeued for a destination site, the changes identified in the deferred transaction record are propagated to the destination site. However, the order in which the changes were made at the source site places some restrictions with respect to the order in which the changes must be made at the destination site.

Specifically, if a first transaction has written to a data item that is subsequently written to or read by a second transaction, then all changes made by the first transaction must be made at a destination site before any of the changes made by the second transaction are made at the destination site. In these circumstances, the second transaction is said to "depend on" the first transaction. When the second transaction merely reads the data item, the dependency is referred to as a write-read dependency. When the second transaction writes to the data item, the dependency is referred to as a write-write dependency.

During replication, it is critical that the order of write-write dependencies be observed so that the copy of the data item at the destination site will reflect the correct value after the two writes have been applied at the destination site. It is desirable that the order of write-read dependencies be observed during replication to reduce the likelihood that the database at the destination site will transition through invalid intervening states during the application of the changes at the destination site.

Another type of dependency, referred to as a read-write dependency, exists if a first transaction reads a data item that is subsequently written to by a second transaction. However, read-write dependencies are not relevant in the context of replication since only updates, not reads, are propagated to the destination sites.

There is a correlation between the prepared times of transactions and whether it is possible for a dependency to exist between the transactions. Specifically, transactions are not able to read or update any changes made by any other transactions until the other transactions are prepared and committed. Therefore, a transaction TXA cannot depend on a transaction TXB if the prepared time of the transaction TXA is earlier than the prepared time of transaction TXB.

There is also a correlation between the times that the deferred transaction records for transactions are written into the deferred transaction queue and whether it is possible for a dependency to exist between the transactions. Specifically, if every transaction acquires its prepared time as its last action before entering the committed state, then the deferred transaction record for any given transaction will never be written into the deferred transaction queue before the deferred transaction records of any transactions on which the given transaction depends. For example, if TXA depends on TXB, then it is guaranteed that the deferred transaction record for TXB will be written to the deferred transaction queue before the deferred transaction record for TXA. This is true because the changes made by TXB are not made visible to any transactions (including TXA) until the deferred transaction record for TXB is written to the deferred transaction queue.

SINGLE-STREAM PROPAGATION

One way to ensure that changes made by a transaction are always applied after the changes made by the transactions on which the transaction depends is to propagate the changes in a sequence based on the batch numbers and the prepared times of the transactions.

Specifically, a single stream can be opened to each destination site. Each process in charge of propagating changes to a destination site introduces the changes into the stream in batch order. The changes within each batch are sorted in prepared time order so that deferred transaction records with earlier prepared times are introduced into the stream prior to deferred transaction records with later prepared times. Since changes are applied at the destination site in the order in which they arrive in the stream, the changes made by each transaction will be made at the destination site after the changes made by any transactions upon which the transaction depends.

The prepared-time ordering of the deferred transaction records may be incorporated into the dequeue process. Specifically, the dequeue query:

```
select * from queue_table
    where (queue_batch_number>last_batch)
    order by queue_batch, prepared_time;
``` will retrieve new batches of deferred transaction records from the deferred transaction queue and order the deferred transaction records based on batch number and prepared time. Based on this ordering, if any transactions in a given batch depend on each other, their changes will be transmitted in the appropriate order. Further, as explained above, the deferred transaction record for a transaction is always written into the deferred transaction queue after the deferred transaction records for the transactions on which it depends. Therefore, it is guaranteed that subsequent batches will not contain transactions on which any of the transactions in the current batch depend.

MULTIPLE-STREAM PROPAGATION

The single-stream propagation technique described above ensures that changes will be applied at the destination sites in the correct order. However, performance is reduced by the fact that only one stream is used to propagate changes to each destination site. According to one embodiment of the invention, multiple streams are used to propagate updates to a single destination site. Because changes sent over one stream may be applied in any order relative to changes sent over another stream, a scheduling mechanism is provided to ensure that changes made by a given transaction will never be applied prior to the changes made by transactions on which the given transaction depends.

Figure 4:
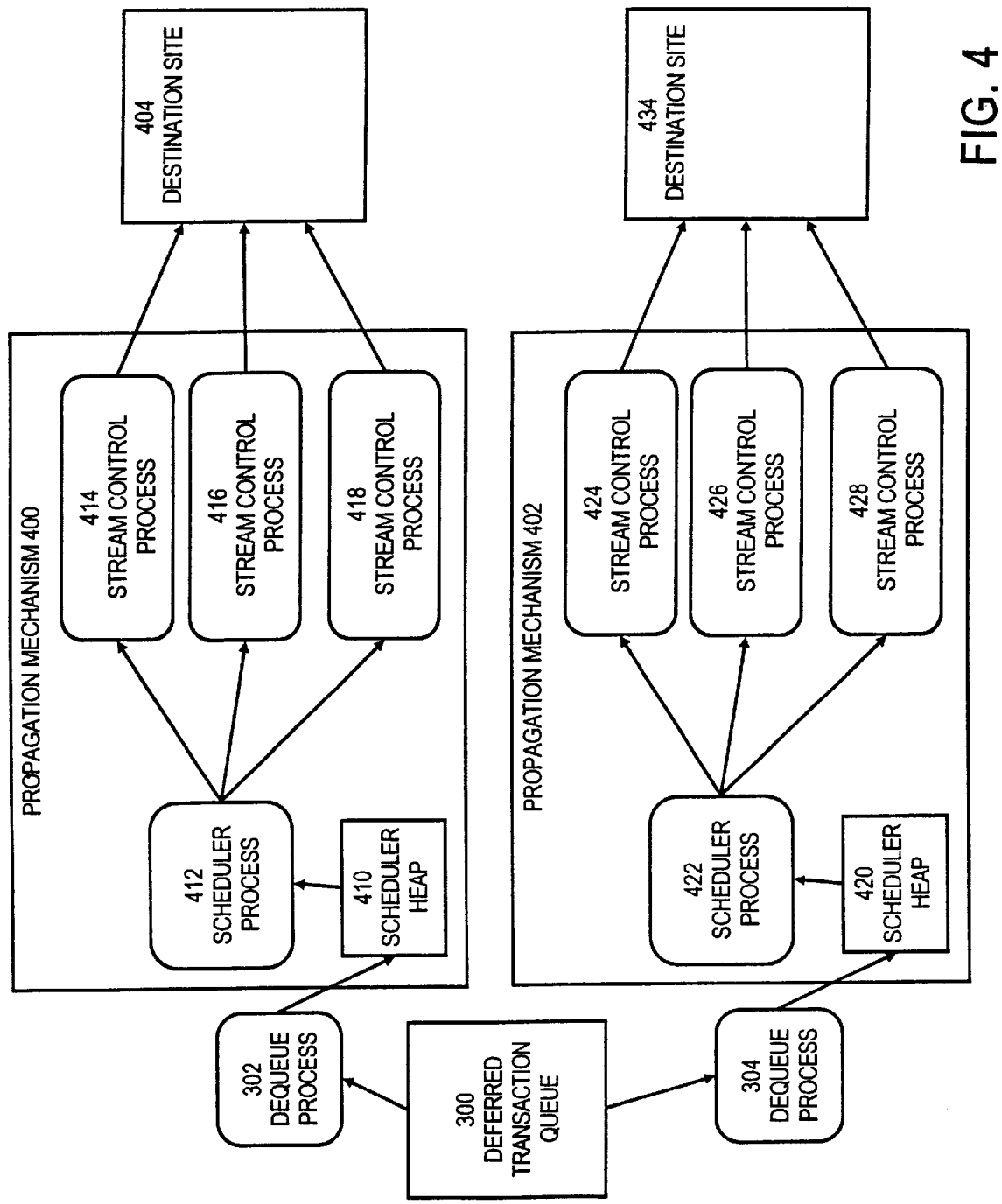
FIG. 4 is a block diagram that illustrates propagation mechanisms that propagate transactions using multiple streams per destination site according to an embodiment of the invention.

Referring to FIG. 4, it illustrates propagation mechanisms 400 and 402 that use multiple streams to propagate transactions to destination sites according to an embodiment of the invention. Propagation mechanisms 400 and 402 propagate transactions to destination sites 404 and 434, respectively. Propagation mechanism 400 includes a scheduler process 412, a scheduler heap 410 and three stream control processes 414, 416 and 418. Each of stream control processes 414, 416 and 418 manages an instance of the streaming protocol used to propagate transactions to destination site 404. Similarly, propagation mechanism 402 includes a scheduler process 422, a scheduler heap 420 and three stream control processes 424, 426 and 428. Each of stream control processes 424, 426 and 428 manages an instance of the streaming protocol used to propagate transactions to destination site 434.

As explained above, dequeue processes 302 and 304 dequeue deferred transaction records from deferred transaction queue 300. In the embodiment illustrated in FIG. 4, dequeue processes 302 and 304 insert the dequeued deferred transaction records into scheduler heaps 410 and 420, respectively, and propagation mechanisms 400 and 402 transmit the transactions specified in the deferred transaction records over multiple streams to destination sites 404 and 434, respectively. Dequeue processes 302 and 304 insert the deferred transaction records of each batch into the scheduler heap in an order based on the prepared times of the corresponding transactions, thus ensuring that the deferred transaction record for any given transaction will never be inserted into the scheduler heap before a deferred transaction record of a transaction on which the transaction depends.

When dequeue process 302 places a deferred transaction record in scheduler heap 410, the deferred transaction record is initially marked as "unsent". Scheduler process 412 is responsible for passing the transactions associated with the deferred transaction records in scheduler heap 410 to stream control processes 414, 416 and 418 in a safe manner. To ensure safety, scheduler process 412 cannot pass a transaction to a stream control process if it is possible that the transaction depends on a transaction that (1) has been propagated to destination site 404 using a different stream control process, and (2) is not known to have been committed at the destination site 404. In addition, the scheduler process 412 cannot pass a transaction to a stream control process if it is possible that the transaction depends on a transaction that has not yet been propagated to destination site 404. According to one embodiment of the invention, scheduler process 412 ensures the safe scheduling of transaction propagation to destination site 404 using the scheduling techniques illustrated in FIG. 5.

Figure 5:
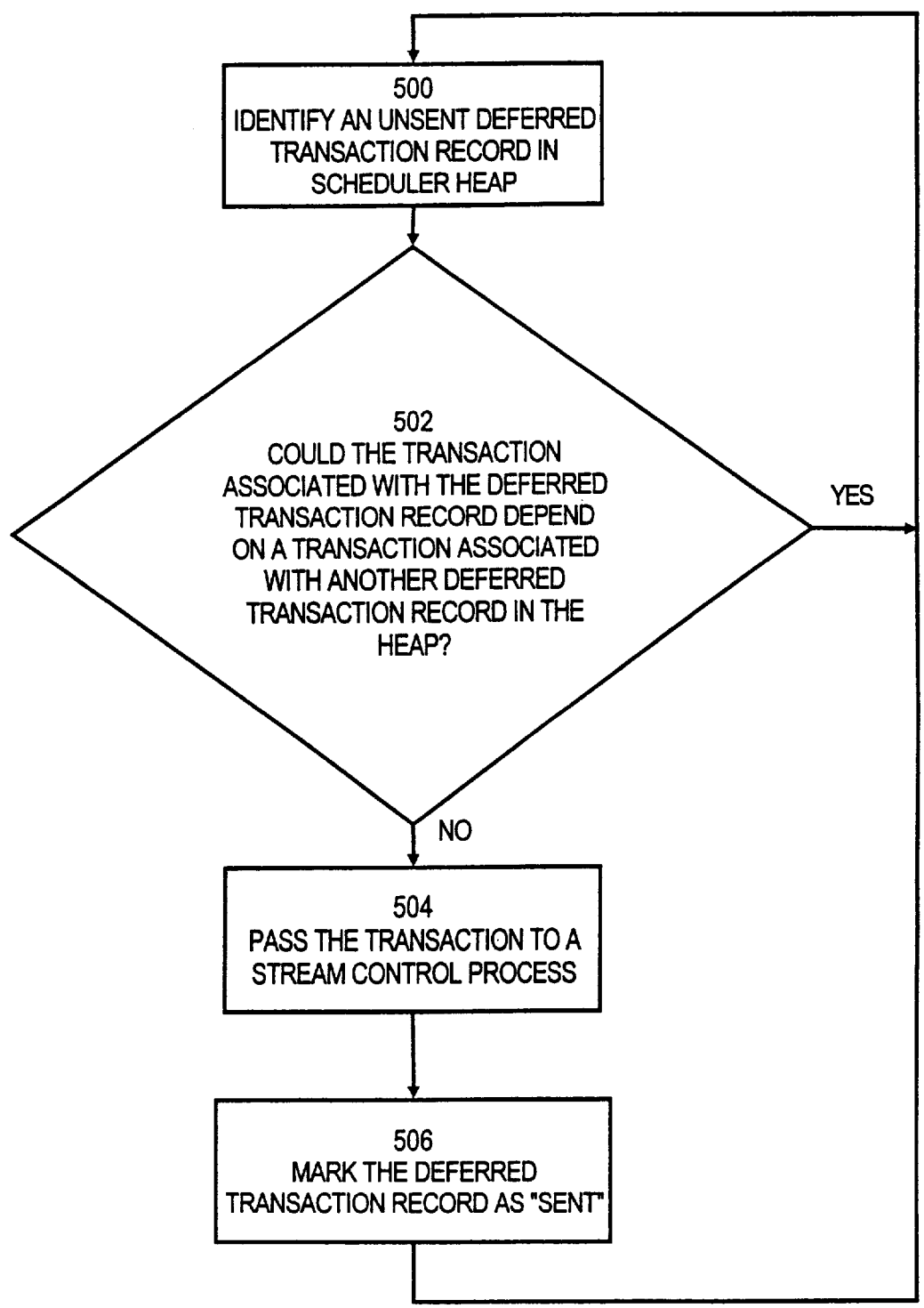
FIG. 5 is a flow chart illustrating the steps used to schedule the transmission of transactions according to an embodiment of the invention.

Referring to FIG. 5, it is a flow chart illustrating steps for scheduling the propagation of transactions according to one embodiment of the invention. At step 500, the scheduler process 412 inspects the deferred transaction records in the scheduler heap 410 to identify an unsent deferred transaction record. When the scheduler process 412 encounters an unsent deferred transaction record, scheduler process 412 determines whether the transaction for that deferred transaction record could possibly depend on any transaction associated with any other deferred transaction record in the scheduler heap 410 (step 502). The determination performed by scheduler process 412 during step 502 shall be described in greater detail below.

If the transaction associated with the deferred transaction record could depend on any transaction associated with any other deferred transaction record in the scheduler heap 410, then the transaction associated with the deferred transaction record is not passed to any stream control process and control passes back to step 500. If the transaction associated with the deferred transaction record could not possibly depend on any transaction associated with any other deferred transaction record in the scheduler heap 410, then the transaction associated with the deferred transaction record is passed to a stream control process at step 504. The stream control process propagates the transaction to the destination site 404. At step 506, the deferred transaction record is marked as "sent". Control then passes back to step 500.

Periodically, the propagation mechanism 400 receives from the destination site 404 messages that indicate which transactions have been committed at the destination site. In response to such messages, the deferred transaction records associated with the transactions are removed from the scheduler heap 410. The removed deferred transaction records no longer prevent the propagation of transactions that depended on the transactions associated with the removed deferred transaction records.

The components of propagation mechanism 402 operate in the same manner as the corresponding components of propagation mechanism 400. Specifically, scheduler process 422 passes transactions associated with unsent deferred transaction records in scheduler heap 420 to stream control processes 424, 426 and 428 when the transaction could not possibly depend on any transaction associated with any other deferred transaction record in the scheduler heap 422.

For the purposes of explanation, the scheduler processes 412 and 422 and the dequeue processes 302 and 304 have been described as separate processes. However, the actual division of finctionality between processes may vary from implementation to implementation. For example, a single process may be used to perform both the dequeuing and scheduling operations for a given site. Similarly, a single process may be used to perform the dequeuing and scheduling operations for all destination sites. The present invention is not limited to any particular division of functionality between processes.

The embodiment illustrated in FIG. 4 includes three stream control processes per destination site. However, the actual number of stream control processes may vary from implementation to implementation. For example, ten streams may be maintained between each source site and each destination site. Alternatively, ten streams may be maintained between the source site and a destination site, while only two streams are maintained between the source site and a different destination site. Further, the number of streams maintained between the source site and destination sites may be dynamically adjusted based on factors such the currently available communication bandwidth.

In the embodiments described above, a transaction is not propagated as long as the transaction may depend on one or more transactions that are not known to have been committed at the destination site. However, a transaction can be safely propagated even when transactions that it may depend on are not known to have been committed at the destination site under certain conditions. Specifically, assume that the scheduler process determines that a transaction TXA cannot possibly depend on any propagated transactions that are not known to have committed except for two transactions TXB and TXC. If it is known that transactions TXB and TXC were propagated in the same stream, then TXA can be safely propagated in that same stream.

According to one embodiment of the invention, a record is maintained to indicate which stream was used to propagate each "sent" transaction. In this embodiment, transactions may be propagated to a destination site when (1) all transactions on which they may depend are known to have committed at the destination site, or (2) all transactions on which they may depend which are not known to have committed at the destination site were propagated over the same stream. In the latter case, transactions must be propagated using the same stream as was used to propagate the transactions on which they may depend.

DEPENDENCY DETERMINATION

As described above, scheduler processes 412 and 422 must determine whether the transactions associated with unsent deferred transaction records could possibly depend on any transactions associated with the other deferred transaction records stored in the scheduler heap. However, due to time and space limitations, it is not practical to store a precise representation of the true dependency relation between all transactions.

Rather than attempt to maintain a precise representation of actual dependencies, a database system is provided in which a mechanism for approximating dependencies is maintained. The approximation must be "safe" with respect to the true dependency relation. That is, the approximation must always indicate that a transaction TXA depends on another transaction TXB if TXA actually depends on TXB. However, the approximation does not have to be entirely accurate with respect to two transactions where there is no actual dependency. Thus, it is acceptable for there to exist some pair of transactions TXA and TXB such that the approximation indicates that TXA depends on TXB when TXA does not actually depend on TXB.

A technique for such an approximation is described in U.S. patent application Ser. No. 08/740,544, filed Oct. 29, 1996, by Swart et al. entitled "Tracking Dependencies Between Transactions in a Database" (attorney docket no. 3018-010), the contents of which are incorporated herein by reference. In that technique, a "dependent time value" is computed for each transaction. The dependent time value for a given transaction is the maximum commit time of any transaction that previously wrote a data item that was either read or written by the given transaction. Using this approximation mechanism, the determination at step 502 may be performed by comparing the dependent time value of the transaction associated with the unsent deferred transaction record with the prepare times of the transactions associated with all other deferred transaction records in the scheduler heap. If the dependent time value is less than all prepare time values, then the transaction cannot depend on any other the transactions associated with the deferred transaction records that are currently in the scheduler heap. Otherwise, it is possible that the transaction depends on one of the other transactions in the scheduler heap.

Using this technique, it is possible for a transaction TXA to be propagated before the another transaction TXB even when the approximation indicates that TXA depends on TXB. However, this will only occur if the deferred transaction record for TXA is inserted into the scheduler heap before the deferred transaction record for TXB. Because the deferred transaction records within each dequeue batch are sorted by prepare time before being inserted into the schedule heap, TXA could not actually depend on TXB if the deferred transaction record for TXA is inserted into the scheduler heap before the deferred transaction record of TXB.

DISTRIBUTED TRANSACTIONS

To ensure the integrity of a database, the database must show all of the changes made by a transaction, or none of the changes made by the transaction. Consequently, none of the changes made by a transaction are made permanent within a database until the transaction has been fully executed. A transaction is said to "commit" when the changes made by the transaction are made permanent to the database.

According to one replication approach, the original transaction at the source site and the propagated transactions at the destination sites are all treated as "child transactions" that form parts of a single "distributed" transaction. To ensure consistency, all changes made by a distributed transaction must be made permanent at all sites if any of the changes are made permanent at any site. The technique typically employed to ensure this occurs is referred to as two-phase commit.

During the first phase of two-phase commit, the process that is coordinating the distributed transaction (the "coordinator process") sends the child transactions to the sites to which they correspond. In the context of replication, the coordinator process will typically be a process executing at the source site. The child transactions are then executed at their respective sites. When a child transaction is fully executed at a given site, the child transaction is said to be "prepared". When a child transaction is prepared at a site, a message is sent from the site back to the coordinating process.

When all of the sites have reported that their respective child transactions are prepared, the second phase of the two phase commit begins. During the second phase of two phase commit, the coordinator processes sends messages to all sites to instruct the sites to commit the child transactions. After committing the child transactions, the sites send messages back to the coordinating process to indicate that the child transactions are committed. When the coordinating process has been informed that all of the child transactions have committed, the distributed transaction is considered to be committed. If any child transaction fails to be prepared or committed at any site, the coordinator process sends messages to all of the sites to cause all child transactions to be "rolled back", thus removing all changes by all child transactions of the distributed transaction.

The advantage of implementing replication through the use of distributed transactions is that the distributed transactions can be successfully rolled back and reapplied as an atomic unit if a failure occurs during execution. However, performing a two phase commit imposes a significant delay between the completion of transactions and when the transactions are actually committed. Specifically, two round trips (prepare, prepared, commit, committed) are made between the source site and each destination site for every distributed transaction before the distributed transaction is committed. The latency imposed by these round trip messages may be unacceptably high.

REPLICATION WITHOUT DISTRIBUTED TRANSACTIONS

According to an embodiment of the invention, streams of deferred transactions are propagated from a source site to one or more destination sites without the overhead of distributed transactions. Specifically, transactions at the source site are committed unilaterally without waiting for any confirmations from the destination sites. Likewise, the destination sites execute and commit replication transactions without reporting back to the source site. To ensure database integrity after a failure, the source and destination sites store information that allows the status of the replication transactions to be determined after a failure.

According to one embodiment of the invention, each destination site maintains an applied transactions table and the source site maintains a durable record of which transactions it knows to have committed at the destination site (a "low water mark"). When a replication transaction commits at a destination site, an entry for the replication transaction is committed to the applied transaction table. After a failure, the low water mark at the source site and the information contained in the applied transactions table at the destination site may be inspected to determine the status of all transactions that have been propagated to the destination site.

Specifically, if either the low water mark at the source site or the applied transaction table at the destination site indicates that a transaction has been committed at the destination site, then the changes made by that transaction do not have to be propagated again as part of the failure recovery process. On the other hand, if neither the low water mark at the source site nor the applied transaction table at the destination site indicates that a transaction that must be propagated to a destination site has been committed at the destination site, then the transaction will have to be propagated again as part of failure recovery.

PURGING THE SCHEDULER HEAP

The scheduler heap does not grow indefinitely. According to one embodiment, entries are periodically deleted from the scheduler heap in response to messages received at the source site from the destination site. The messages contain "committed transactions data" that indicates that one or more transactions that were propagated from the source site have been successfully executed and committed at the destination site. In response to receiving committed transactions data from a destination site, the entries in the scheduler heap for the transactions specified in the committed transactions data are deleted from the scheduler heap.

When entries are deleted from the scheduler heap, it is not necessary to immediately update the low water mark maintained by the source site to indicate that the transactions specified in the committed transactions data were committed at the destination site because the applied transaction table at the destination site already indicates that the transactions specified in the committed transactions data were committed at the destination site. Consequently, those transactions will not be retransmitted to the destination site after a failure.

The committed transactions data may be, for example, the transaction sequence number of the last transaction that was committed at the destination site that arrived at the destination site on a particular stream. The scheduler keeps track of which transactions were sent on which streams. Since the transactions that are propagated on any given stream are processed in order at the destination site, the source site knows that all transactions on a that particular stream that preceded the transaction identified in the committed transaction data have also been committed at the destination site. The entries for those transactions are deleted from the scheduler heap along with the entry for the transaction specifically identified in the committed transactions data.

FLUSH TOKENS

Various events may cause a destination site to transmit messages containing committed transactions data. For example, such messages may be sent when a buffer is filled at the destination site, or in response to "flush tokens". A flush token is a token sent on a stream from the source site to the destination site to flush the stream.

The destination site responds to the flush token by executing and committing all of the transactions that preceded the flush token on that particular stream, and by sending to the source site committed transaction information that indicates which transactions that have been propagated from the source site on that stream have been committed at the destination site. As mentioned above, this committed transaction information may simply identify the most recently committed transaction from the stream on which the flush token was sent. The source site knows that all transactions that preceded the identified transaction on the stream have also been committed at the destination site.

UPDATING THE LOW WATER MARK

The source site periodically updates the low water mark associated with a destination site based on the committed transaction information received from the destination site. Various mechanisms may be used to determine a low water mark for a destination site based on committed transaction information received from the destination site.

For example, according to one embodiment of the invention, an ordered list of transactions is maintained for each stream that is being used to send deferred transactions from a source site to a destination site. Each element in an ordered list represents a transaction that was propagated on the stream associated with the ordered list. The order of the elements in the ordered list indicates the order in which the corresponding transactions were propagated on the stream associated with the ordered list.

As mentioned above, committed transaction information may identify a transaction that is known to have been committed at the destination site. In response to the committed transaction information, a process at the source site removes from the ordered list of the appropriate stream the element that corresponds to the identified transaction, as well as all preceding elements.

By truncating the ordered lists for each stream in this manner, the low water mark may be determined by inspecting the ordered lists for all streams to a given destination site and identifying the oldest transaction represented on the lists. All transactions older than that transaction have necessarily been committed at the destination site, so data identifying that transaction may be stored as the low water mark for that destination site.

PURGING THE APPLIED TRANSACTION TABLES

The maintenance of an applied transaction table at every destination site allows for accurate recovery after a failure in a replicated environment. Further, if each applied transaction table is allowed to grow indefinitely, then maintenance of a low water mark at the source site is unnecessary because the applied transaction table will reflect all of the propagated transactions that have ever committed at the destination site. However, an infinitely growing data structure is generally not practical. Therefore, a mechanism is provided for periodically purging entries from the applied transaction tables according to one embodiment of the invention.

To purge records from an applied transaction table, the source site sends a "purge" message to the destination site. The purge message indicates the low water mark that is durably stored at the source site. Upon receiving this message from the source site, the destination site may then delete from the applied transaction table the entries for all transactions that are older than the transaction associated with the low water mark.

Significantly, a purge message is not sent to the destination site unless the low water mark specified in the purge message has been stored on non-volatile memory at the source site. Consequently, the applied transactions table will always identify all transactions that (1) are above the durably stored low water mark and (2) have been propagated to and committed at the destination site.

THE LOW WATER MARK TABLE

According to one embodiment, the source site maintains a "low water mark table" that contains a low water mark for each destination site. As explained above, the low water mark for a destination site identifies a transaction T such that every transaction that was dequeued before T is known to have been applied and committed at that destination site. Under certain conditions, some transactions that are later than T in the dequeue sequence may also have committed at the destination site, but this fact may not yet be known at the source site.

Maintaining a low water mark table at the source site has the benefit that after a failure, the source site only needs to be informed about the status of transactions that are above the low water mark.

DEQUEUE SEQUENCE NUMBERS

According to one embodiment of the invention, each deferred transaction record is given a dequeue sequence number upon being dequeued. For each destination site, dequeue sequence numbers are assigned consecutively as transactions are dequeued. The fact that the sequence numbers are consecutive means that a skip in the sequence indicates the absence of a transaction, rather than just a delay between when transactions were assigned sequence numbers. The dequeue sequence number associated with a transaction is propagated to the destination site with the transaction. The destination site stores the dequeue sequence number of a transaction in the applied transaction table entry for the transaction.

Figure 6:
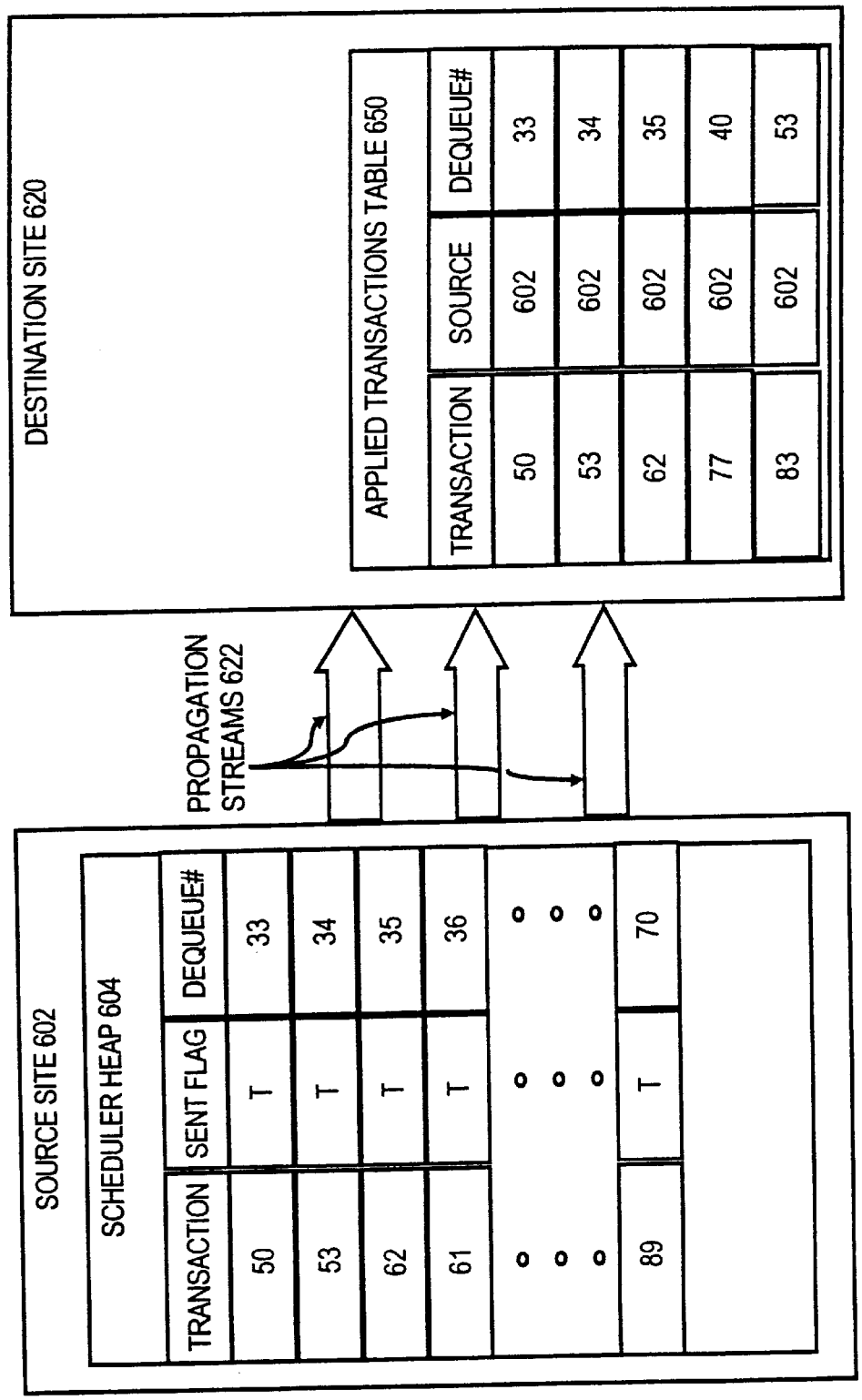
FIG. 6 is a block diagram of a replication system in which the destination site maintains an applied transaction table that may be used in recovery after a failure, according to an embodiment of the invention.

For example, FIG. 6 illustrates a replication system in which deferred transactions are propagated from a source site 602 to a destination site 620 over a plurality of propagation streams 622. The scheduler heap 604 at the source site 602 contains entries for the transactions that have been assigned dequeue numbers 33 through 70. In the illustrated example, all of these transactions have been propagated to the destination site 620 over one of the propagation streams 622. Therefore, all of the entries are marked as "sent". It should be noted that the scheduler heap 604 may additionally include any number of unsent entries for transactions that have not yet been propagated.

The low water mark stored at the source site 602 for destination site 620 is 33. In response to a purge message containing the low water mark 33, all entries with dequeue sequence numbers below 33 have been removed from applied transaction table 650. Applied transaction table 650 currently indicates that the transactions associated with dequeue numbers 33, 34, 35, 40 and 53, which are equal to or above the low water mark of 33, have been committed at the destination site 620.

RANGE-BASED COMMIT TRANSACTIONS DATA

During recovery, a source site must determine the status of transactions that have been propagated to each destination site. As explained above, the status of the transactions may be determined based on the low water marks and information in the applied transaction tables of the destination sites. If the applied transaction table at a destination site contains an entry for a transaction or if the transaction falls below the low water mark for that destination site, then the transaction was committed at the destination site prior to the failure. Otherwise, the transaction had not committed at the destination site prior to the failure.

Because low water marks are maintained at the source site, the source site only needs to be informed of the transactions that were committed at a destination site that are above the low water mark for the destination site (the "above-the-mark committed transactions"). Therefore, one step in the recovery process is communicating to the source site information that identifies the set of above-the-mark committed transactions.

Even when low water marks are maintained at a source site, the set of above-the-mark committed transactions may still be huge if the low water marks were not updated recently before the failure. Therefore, according to one embodiment of the invention, the set of above-the-mark committed transactions is sent from the destination site to the source site as a series of dequeue sequence number ranges.

According to one embodiment, the set of above-the-mark committed transactions is sent from the destination site to the source site in the form of tuples, where each tuple identifies a range of dequeue sequence numbers. For example, assume that destination site 620 had, prior to a failure, committed the transactions propagated from source site 602 with dequeue sequence numbers up to 55, with dequeue sequence numbers from 90 to 200, and with dequeue sequence numbers from 250 to 483.

After the failure, source site 602 sends the low water mark 33 to destination site 620 to request the set of above-the-mark committed transactions that were propagated to destination site 620 from source site 602. In response, destination site 620 sends back to source site 602 the tuples (55, 90), (200,250) and (483,-). With this information, the recovery process knows that all transactions that fall within the indicated ranges will have to be re-propagated to destination site 620.

Significantly, the number of tuples that must be sent as committed transaction information is limited to the number of gaps between the dequeue sequence numbers of committed transactions, and the number of gaps is bounded by the size of the scheduling heap. Therefore, if the original transaction heap was small enough to be stored in dynamic memory prior to the failure, then the committed transaction information should fit in the dynamic memory during recovery.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for duplicating at a destination site changes made to data at a source site, the method comprising the steps of:
   A) establishing a plurality of streams between the source site and the destination site;
   B) using said plurality of streams in parallel to propagate changes made at said source site to said destination site by performing the steps of:
      (B1) maintaining a record of transactions whose changes must be propagated rom the source site to the destination site;
      (B2) before propagating changes made by a transaction to the destination site on a stream of said plurality of streams, performing the steps of:
         (a) identifying a set of transactions whose changes are not known to have been made permanent at the destination site by inspecting the record of transactions; and
         (b) determining whether the transaction could possibly depend on any transaction in said set of transactions;
      (B3) if said transaction could not possibly depend on any transaction in said set of transactions, then propagating the changes made by the transaction to the destination site using one of said plurality of streams.

2. The method of claim 1 wherein if said transaction could possibly depend on any transaction in said set of transactions, then performing the steps of:
   determining whether all transactions in said set of transactions on which said transaction could possibly depend were propagated on the same stream of said plurality of streams; and
   if all transactions in said set of transactions on which said transaction could possibly depend were propagated on a particular stream of said plurality of streams, then propagating the changes made by said transaction from said source site to said destination site using said particular stream.

3. The method of claim 2 further comprising the step of waiting to propagate the changes made by said transaction until either:
   changes made by all transactions on which the transaction could possibly depend are known to have been made permanent at the destination site; or
   changes made by all transactions on which the transaction could possibly depend that are not known to have been made permanent at the destination site were sent over a single stream of said plurality of streams.

4. The method of claim 1 further comprising the step of waiting to propagate the changes made by said transaction until changes made by all transactions on which the transaction could possibly depend are known to have been made permanent at the destination site.

5. The method of claim 1 wherein the step of determining whether the transaction could possibly depend on any transaction in said set of transactions further comprises the steps of:
   maintaining a depends-on time for said transaction, wherein the depends-on time indicates a latest commit time of all transactions on which said transaction could depend; and
   comparing the depends-on time of the transaction with commit times of each transaction in said set of transactions.

6. The method of claim 1 wherein:
   said record includes a plurality of entries, where each entry of said plurality of entries corresponds to a transaction to be propagated to said destination site;
   the method further comprises the steps of
      adding an entry for said transaction to said plurality of entries;
      marking said entry to indicate that said transaction has not yet been sent to said destination site;
      after propagating changes made by said transaction, marking said entry to indicate that said transaction has been sent.

7. A method for propagating changes from a source site to a destination site, the method comprising the steps of:
   adding to a set of records a record for each transaction that has made changes that must be propagated from the source site to the destination site;
   for each record in said set of records, performing the steps of:
      determining whether the transaction associated with the record could possibly depend on any transaction associated with any record in the set of records;
      if the transaction associated with the record could not possibly depend on any transaction associated with any record in the set of records, then
         propagating the changes made by the transaction on one of a plurality of streams established between the source site and the destination site.

8. The method of claim 7 further comprising the step of removing records from the set of records when the source site is informed that the changes made by the transactions associated with the records have been made permanent at the destination site.

9. The method of claim 7 further including the step of marking the record with a value indicates that the transaction associated with the record has been sent to the destination site in response to propagating the changes made by the transaction.

10. The method of claim 7 wherein the step of determining whether the transaction associated with the record could possibly depend on any transaction associated with any record in said set of records comprises the steps of:
   determining a depends-on time for the transaction associated with the record, where the depends-on time indicates a commit time of a latest transaction on which the transaction depends; and
   comparing the depends-on time with commit times of transactions represented in said set of records.

11. The method of claim 7 wherein said step of adding to a set of records a record for each transaction that has made changes that must be propagated from the source site to the destination site includes the step of adding to a data structure stored in volatile memory an entry for each transaction that has made changes that must be propagated from the source site to the destination site.

12. A computer-readable medium having stored thereon sequences of instructions for propagating changes from a source site to a destination site, the sequences of instructions including sequences of instructions for performing the steps of:
   adding to a set of records a record for each transaction that has made changes that must be propagated from the source site to the destination site;
   for each record in said set of records, performing the steps of:
      determining whether the transaction associated with the record could possibly depend on any transaction associated with any record in the set of records;
      if the transaction associated with the record could not possibly depend on any transaction associated with any record in the set of records, then
         propagating the changes made by the transaction on one of a plurality of streams established between the source site and the destination site.

13. The computer-readable medium of claim 12 further comprising sequences of instructions for performing the step of removing records from the set of records when the source site is informed that the changes made by the transactions associated with the records have been made permanent at the destination site.

14. The computer-readable medium of claim 12 further comprising sequences of instructions for performing the step of marking the record with a value indicates that the transaction associated with the record has been sent to the destination site in response to propagating the changes made by the transaction.

15. The computer-readable medium of claim 12 wherein the step of determining whether the transaction associated with the record could possibly depend on any transaction associated with any record in a second set of records comprises the steps of:
   determining a depends-on time for the transaction associated with the record, where the depends-on time indicates a commit time of a latest transaction on which the transaction depends; and
   comparing the depends-on time with commit times of transactions represented by said set of records.

16. The computer-readable medium of claim 12 wherein said step of adding to a set of records a record for each transaction that has made changes that must be propagated from the source site to the destination site includes the step of adding to a data structure stored in volatile memory an entry for each transaction that has made changes that must be propagated from the source site to the destination site.

17. A method for duplicating at a destination site changes made to data at a source site, the method comprising the steps of:
   A) establishing a plurality of streams between the source site and the destination site;
   B) using said plurality of streams in parallel to propagate changes made at said source site to said destination site by performing the steps of:
      (B1) determining whether a transaction to be propagated to the destination site depends on any other transaction to be propagated to the destination site that is not known to have been made permanent at the destination site;
      (B2) if said transaction could not possibly depend on any other transaction to be propagated to the destination site that is not known to have been made permanent at the destination site, then propagating the changes made by the transaction to the destination site using one of said plurality of streams.

18. The method of claim 17 wherein if said transaction could possibly depend on any other transaction to be propagated to the destination site that is not known to have been made permanent at the destination site, then performing the steps of:
   determining whether all transactions to be propagated to the destination site on which said transaction could possibly depend were propagated on the same stream of said plurality of streams; and
   if all transactions to be propagated to the destination site on which said transaction could possibly depend were propagated on a particular stream of said plurality of streams, then propagating the changes made by said transaction from said source site to said destination site using said particular stream.

19. The method of claim 17 further comprising the step of waiting to propagate the changes made by said transaction until changes made by all transactions on which the transaction could possibly depend are known to have been made permanent at the destination site.

20. The method of claim 17 wherein the step of determining whether a transaction to be propagated to the destination site depends on any other transaction to be propagated to the destination site that is not known to have been made permanent at the destination site further comprises the steps of:
   maintaining a depends-on time for said transaction, wherein the depends-on time indicates a latest commit time of all transactions on which said transaction could depend; and
   comparing the depends-on time of the transaction with commit times of transactions to be propagated to the destination site that are not known to have been made permanent at the destination site.

21. A computer-readable medium carrying one or more sequences of one or more instructions for duplicating at a destination site changes made to data at a source site, the one or more sequences of one or more instructions including instructions which, when executed by one or more processors, cause the one or more processors to perform the steps of:

A) establishing a plurality of streams between the source site and the destination site;
B) using said plurality of streams in parallel to propagate changes made at said source site to said destination site by performing the steps of:
  (B1) maintaining a record of transactions whose changes must be propagated from the source site to the destination site;
  (B2) before propagating changes made by a transaction to the destination site on a stream of said plurality of streams, performing the steps of:
    (a) identifying a set of transactions whose changes are not known to have been made permanent at the destination site by inspecting the record of transactions; and
    (b) determining whether the transaction could possibly depend on any transaction in said set of transactions;
  (B3) if said transaction could not possibly depend on any transaction in said set of transactions, then propagating the changes made by the transaction to the destination site using one of said plurality of streams.

22. The computer-readable medium of claim 21, further comprising injections for performing the following steps if said transaction could possibly depend on any transaction in said set of transactions:
  determining whether all transactions in said set of transactions on which said transaction could possibly depend were propagated on the same stream of said plurality of streams; and
  if all transactions in said set of transactions on which said transaction could possibly depend were propagated on a particular stream of said plurality of streams, then propagating the changes made by said transaction from said source site to said destination site using said particular stream.

23. The computer-readable medium of claim 22 further comprising instructions for performing the step of waiting to propagate the changes made by said transaction until either:
  changes made by all transactions on which the transaction could possibly depend are known to have been made permanent at the destination site; or
  changes made by all transactions on which the transaction could possibly depend that are not know to have been made permanent at the destination site were sent over a single stream of said plurality of streams.

24. The computer-readable medium of claim 21 further comprising instructions for performing the step of waiting to propagate the changes made by said transaction until changes made by all transactions on which the transaction could possibly depend are known to have been made permanent at the destination site.

25. The computer-readable medium of claim 21 wherein the step of determining whether the transaction could possibly depend on any transaction in said set of transactions further comprises the steps of:
  maintaining a depends-on time for said transaction, wherein the depends-on time indicates a latest commit time of all transactions on which said transaction could depend; and
  comparing the depends-on time of the transaction with commit times of each transaction in said set of transactions.

26. The computer-readable medium of claim 21 wherein:
  said record includes a plurality of entries, where each entry of said plurality of entries corresponds to a transaction to be propagated to said destination site; the computer-readable medium further comprising instructions for performing the steps of
    adding an entry for said transaction to said plurality of entries;
    marking said entry to indicate that said transaction has not yet been sent to said destination site;
    after propagating changes made by said transaction, marking said entry to indicate that said transaction has been sent.

27. A computer-readable medium carrying one or more sequences of one or more instructions for duplicating at a destination site changes made to data at a source site, the one or more sequences of one or more instructions including instructions which, when executed by one or more processors, cause the one or more processors to perform the steps of:
  A) establishing a plurality of streams between the source site and the destination site;
  B) using said plurality of streams in parallel to propagate changes made at said source site to said destination site by performing the steps of:
    (B1) determining whether a transaction to be propagated to the destination site depends on any other transaction to be propagated to the destination site that is not known to have been made permanent at the destination site;
    (B2) if said transaction could not possibly depend on any other transaction to be propagated to the destination site that is not known to have been made permanent at the destination site, then propagating the changes made by the transaction to the destination site using one of said plurality of streams.

28. The computer-readable medium of claim 27, further comprising instructions for performing the following steps if said transaction could possibly depend on any other transaction to be propagated to the destination site that is not know to have been made permanent at the destination site:
  determining whether all transactions to be propagated to the destination site on which said transaction could possibly depend were propagated on the same stream of said plurality of streams; and
  if all transactions to be propagated to the destination site on which said transaction could possibly depend were propagated on a particular stream of said plurality of streams, then propagating the changes made by said transaction tom said source site to said destination site using said particular stream.

29. The computer-readable medium of claim 27 further comprising instructions for performing the step of waiting to propagate the changes made by said transaction until changes made by all transactions on which the transaction could possibly depend are known to have been made permanent at the destination site.

30. The computer-readable medium of claim 27 wherein the step of determining whether a transaction to be propagated to the destination site depends on any other transaction to be propagated to the destination site that is not known to have been made permanent at the destination site further comprises the steps of:
  maintaining a depends-on time for said transaction, wherein the depends-on time indicates a latest commit time of all transactions on which said transaction could depend; and
  comparing the depends-on time of the transaction with commit times of transactions to be propagated to the destination site that are not known to have been made permanent at the destination site.

31. A system for duplicating changes, the system comprising:
- a source site;
- a destination site;
- a plurality of streams between the source site and the destination site; and
- a propagation mechanism, wherein the propagation mechanism is configured to
- propagate changes made at said source site to said destination site by performing the steps of:
  - A1) maintaining a record of transactions whose changes must be propagated from the source site to the destination site;
  - (A2) before propagating changes made by a transaction to the destination site on a stream of said plurality of streams, performing the steps of:
    - (a) identifying a set of transactions whose changes are not known to have been made permanent at the destination site by inspecting the record of transactions; and
    - (b) determining whether the transaction could possibly depend on any transaction in said set of transactions;
  - (A3) if said transaction could not possibly depend on any transaction in said set of transactions, then propagating the changes made by the transaction to the destination site using one of said plurality of streams.

* * * * *